(12) United States Patent
Wollenweber

(10) Patent No.: US 10,392,117 B2
(45) Date of Patent: Aug. 27, 2019

(54) ICING CONDITION DETECTION USING INSTANTANEOUS HUMIDITY SENSING

(71) Applicant: General Electric Company, Schenectady, NY (US)

(72) Inventor: Gary Craig Wollenweber, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 293 days.

(21) Appl. No.: 15/275,013

(22) Filed: Sep. 23, 2016

(65) Prior Publication Data

US 2018/0086471 A1    Mar. 29, 2018

(51) Int. Cl.
  *B64D 15/04*    (2006.01)
  *B64D 15/22*    (2006.01)
  *B64D 15/16*    (2006.01)
  *B64D 33/02*    (2006.01)

(52) U.S. Cl.
  CPC .............. *B64D 15/22* (2013.01); *B64D 15/04* (2013.01); *B64D 15/163* (2013.01); *B64D 33/02* (2013.01); *B64D 2033/0233* (2013.01)

(58) Field of Classification Search
  CPC .................... B64D 15/22; B64D 15/04; B64D 2033/0233; F02C 7/047
  See application file for complete search history.

(56) References Cited

U.S. PATENT DOCUMENTS

| | | | | |
|---|---|---|---|---|
| 4,852,343 A | * | 8/1989 | Norris | B64D 15/22 60/779 |
| 8,544,279 B2 | * | 10/2013 | Sappey | F01D 21/003 431/75 |
| 8,825,214 B2 | * | 9/2014 | Haffner | G01J 3/42 422/82.07 |
| 2005/0039516 A1 | * | 2/2005 | Fleming | G01K 13/02 73/23.2 |
| 2011/0226904 A1 | * | 9/2011 | Flemming | B64D 15/20 244/134 F |

(Continued)

FOREIGN PATENT DOCUMENTS

EP    2375237 A1    10/2011

*Primary Examiner* — Philip J Bonzell
*Assistant Examiner* — Tye William Abell
(74) *Attorney, Agent, or Firm* — General Electric Company; William Scott Andes

(57) ABSTRACT

A system and method for monitoring icing conditions that are suitable ice formation on an aircraft and propulsion system. The system includes instrumentation that instantaneously detects ambient humidity, ambient temperature and ambient pressure. The sensed information is transmitted to a controller that evaluates the information to determine whether certain pressure, temperature and humidity criteria are favorable for icing and, declaring icing conditions. The system also includes an aircraft engine-mounted ice mitigation system. When conditions for ice formation are favorable, the controller either informs the pilot that conditions for ice formation are favorable or automatically activates the ice mitigation system, or both. The pilot optionally may inactivate the ice mitigation system. When sensed conditions indicate that conditions for ice formation are not favorable, the controller determines whether the ice mitigation system is activated and inactivates the system if activated.

26 Claims, 7 Drawing Sheets

(56) References Cited

U.S. PATENT DOCUMENTS

| | | | | |
|---|---|---|---|---|
| 2011/0277443 A1* | 11/2011 | Pereira | ........... | B64D 15/12 |
| | | | | 60/39.093 |
| 2012/0060510 A1* | 3/2012 | Badami | ........... | G01J 3/108 |
| | | | | 60/796 |
| 2013/0061597 A1* | 3/2013 | Chillar | ........... | F02C 7/04 |
| | | | | 60/775 |
| 2013/0284856 A1* | 10/2013 | Botura | ........... | B64D 15/12 |
| | | | | 244/134 D |
| 2013/0327012 A1* | 12/2013 | Mahabub | ........... | F02C 7/047 |
| | | | | 60/39.093 |
| 2015/0040577 A1* | 2/2015 | Dischinger | ........... | F02C 7/00 |
| | | | | 60/779 |

* cited by examiner

ICING CONDITION DETECTION USING INSTANTANEOUS HUMIDITY SENSING

FIELD OF THE INVENTION

The present invention is directed to identifying favorable conditions for aircraft ice formation by continuous monitoring of ambient pressure, temperature and humidity and initiating steps to avoid ice formation under detected favorable conditions.

BACKGROUND OF THE INVENTION

Commercial and military aircraft encounter atmospheric icing conditions at certain combinations of temperature, altitude, pressure and humidity. The icing conditions can cause ice to accumulate on aircraft surfaces, engine inlets, and engine flow path surfaces. The aircraft ice accumulation can cause loss of lift, aerodynamic stall, and loss of aircraft control. At a minimum, ice accumulation results in a gain of weight for the aircraft, affecting aircraft performance and efficiency. The engine ice accumulation also can cause loss of airflow, aerodynamic stall, and loss of engine thrust. The shedding of large ice masses in an engine and/or engine inlet can seriously damage engine components causing loss of thrust or make the engine inoperable. It is critical that icing conditions and ice accumulation be detected and that effective ice mitigation be employed before the more serious effects are encountered.

Commercial and military aircraft gather forecast information on atmospheric conditions from meteorologists and climatologists, including humidity in the ambient air at high altitude. Such data is useful in planning the flights but such information may or may not be what aircraft actually encounter due to natural atmospheric variations. Current aircraft have the capability to determine ambient temperature and pressure from aircraft sensors. Current aircraft have no capability to measure ambient humidity.

Ice formation is a characteristic of aircraft engine design, and different engine models have different ice formation characteristics. Atmospheric characteristics, discussed above, include ambient temperature, pressure and humidity. Ambient temperature and pressure at altitude are currently measured substantially instantaneously by all aircraft. Until recently, instantaneous measurement of humidity has not been attainable. Traditional humidity sensors have relied on chilled mirror (dew or frost point) or resistance sensors that are unable to perform satisfactorily at the cold ambient temperatures and low densities of a high altitude atmosphere. These systems are slow responding, unstable, require frequent calibration, and are often inaccurate at the typical conditions encountered at ambient temperatures, conditions under which most ices occur.

FIG. 1 is an available depiction of airplane and engine certification requirements in supercooled large drop, mixed phase, and ice crystal icing conditions taken from the Jun. 29, 2010 Federal Register. This Figure is a graph of altitude vs. total water content (TWC). This graph depicts the standard icing envelope for an aircraft. The horizontal axis represents the aircraft altitude (in thousands of feet). The vertical axis represents TWC or absolute humidity. The icing envelope is depicted on the graph; isotherms are shown at temperatures from 0° C. to −60° C. The upper solid line establishes the upper boundary of the icing envelope and the lower dashed line establishes the lower boundary of the icing envelope. Aircraft altitude is sensed by pressure instrumentation which is standard equipment on aircraft. TWC has been based on forecast information on atmospheric conditions provided by meteorologists and climatologists. Ice mitigation has been instituted based on these forecasts. Ice mitigation generally imposes engine and aircraft performance penalties. To the extent that the prognostications are inaccurate, these performance penalties are needlessly imposed when ice mitigation is activated when it is not necessary.

Some modern aircraft engines currently deal with ice accumulation by use of an engine control system which senses ice accumulation by departure of measured engine performance parameters from the normal performance operating schedule. When icing is detected by a schedule departure, one or more engine geometries are cyclically varied to shed or melt the ice at the expense of engine fuel efficiency and component life. When the ice has melted or has been shed, the engine performance returns to normal operating schedule. There is no way to determine if the aircraft has left the icing conditions while the cyclical engine geometry variations are ongoing. Also there is no way to determine the accumulated ice has melted or has been shed while the cyclical engine geometry variations are ongoing.

Current FAA regulations require the cyclical engine geometry variations to continue for a period of time for the aircraft to leave the icing conditions. The cyclical engine geometry variations are then stopped, performance is monitored, if no performance schedule departure is detected, another period of cyclical engine geometry variations is commanded to be absolutely sure the aircraft has left the icing condition. If performance departure is sensed, the mitigation procedure begins again. If no performance departure is detected, the mitigation process is indefinitely suspended until another performance departure is sensed by the engine control system.

The addition of a fast response absolute humidity sensor, used in conjunction with existing temperature and pressure sensors, would aid in mitigating these aforementioned weaknesses by informing the ice mitigation control when the aircraft was approaching or had left an ice forming region, thereby minimizing the period of time where ice mitigation is enabled at the expense of fuel consumption and mechanical wear on the engine. A controller using instantaneous measured conditions of temperature, pressure and humidity then can process this information continuously and instantaneously to determine whether the aircraft is within the icing envelope so that ice mitigation systems can be used when necessary.

BRIEF DESCRIPTION OF THE INVENTION

A system and method for monitoring conditions of ice formation and activating an aircraft propulsion mounted ice mitigation system or procedure when the sensed atmospheric conditions are favorable for ice formation, and inactivating the ice mitigation system when the sensed atmospheric conditions for ice formation are not favorable is set forth herein. The system includes instrumentation that instantaneously detects ambient humidity, such as a Tunable Diode Laser Absorption Spectroscope, hereinafter referred to as a TDLAS. The humidity measurement instrumentation is mounted on or near an aircraft engine propelling the aircraft. The system also utilizes installed instrumentation for instantaneously sensing ambient temperature and ambient pressure currently in aircraft. The sensed information is transmitted to a controller that uses the information to monitor the conditions for ice formation to determine whether the icing envelope has been entered. The system also includes an aircraft engine-mounted ice mitigation system. The controller gathers the information, and monitors the conditions for ice formation. These conditions may be transmitted to the pilot. When conditions for ice formation are favorable, the controller automatically activates the ice mitigation system. The system also informs the pilot that conditions for ice formation are favorable, allowing the pilot to override the system, if desired. When sensed conditions indicate that conditions for ice formation are not favorable, the controller determines whether the ice mitigation system is activated and inactivates the ice mitigation system if activated. The pilot may inactivate the ice mitigation system if there is no threat of icing condition or when seasonal atmosphere make icing impossible. It is likely, but not required, that the icing condition sensing and pilot notification system is always active.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

A system for monitoring conditions of ice formation by an aircraft is set forth. The system further activates or inactivates means for ice mitigation based on the monitored conditions. The system activates an aircraft propulsion-mounted system for suppressing ice formation when the sensed atmospheric conditions are favorable for ice formation. It further inactivates the system for suppressing ice formation when the sensed atmospheric conditions for ice formation are not favorable. It further notifies the pilot when the sensed atmospheric conditions are favorable for ice formation as well as when the sensed atmospheric conditions are not favorable for ice formation.

The system operates instantaneously in real time, since even slight delays in monitoring the conditions for formation of ice may result in a delay of the ice mitigation system to activate, resulting in formation of ice in the engine. The formation of ice, even briefly, may have detrimental effects on aircraft in flight, as the ice may alter the inlet, fan, and/or compressor airflow resulting in engine stall, surge or loss of thrust.

The system continuously and instantaneously monitors the humidity, temperature and pressure of the ambient atmosphere through which the aircraft is moving. These parameters are important and their values are used to determine whether ice is likely to form, with great precision, the values compared to the current ice crystal icing conditions as set for the in FIG. 1. It will be recognized that FIG. 1 determines the envelope currently accepted for ice crystal formation, but future developments may result in refinement of the envelope currently set forth in the graph of FIG. 1. Since all turbo jet and turbo fan jet aircraft include pressure measurement instrumentation and temperature measurement instrumentation that monitor these respective parameters in real time, instantaneous humidity measurement instrumentation for rapidly monitoring ambient humidity and changes to it are required for detecting icing conditions, and the present invention provides such instrumentation. This monitored humidity data is transmitted to a controller along with pressure measurements and temperature measurements. The controller, using preprogrammed algorithms, then is able to determine continuously and instantaneously whether the ambient conditions are favorable or unfavorable for ice formation so that the necessary ice mitigation countermeasures can be activated when ambient conditions are favorable and can be inactivated when ambient conditions are no longer favorable or are unfavorable for ice formation.

Figure 2:
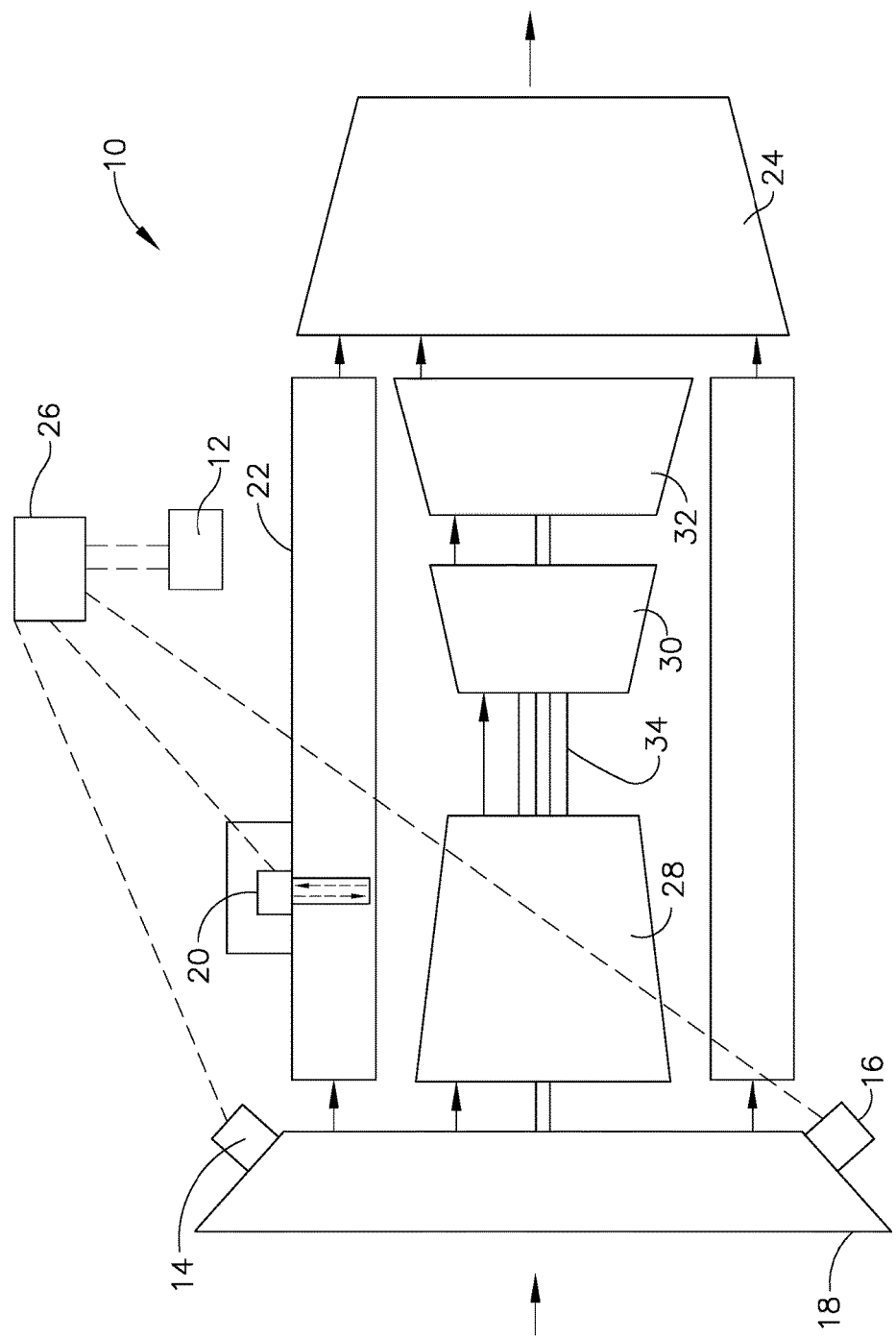
FIG. 2 depicts a humidity indicator mounted on and in communication with a bypass duct.

FIG. 2 depicts a system 10 for monitoring the conditions for ice formation. The system depicted in FIG. 2 is a preferred embodiment. System 10 includes an ice mitigation system that includes temperature measurement instrumentation 14, pressure measurement instrumentation 16, instantaneous humidity measurement instrumentation 20, and a controller 26. In FIG. 2, as in all the Figures, the dashed lines represent pathways for communication between the various monitoring instrumentation and the controller and between the controller and ice mitigation instrumentation, which permits the transmission of data and control instructions. These pathways may be via signal cables (hardwired), optical fiber, or RF (low power with limited distance capabilities).

As depicted in FIG. 2, ambient temperature measurement instrumentation 14 and ambient pressure measurement instrumentation 16 are depicted as mounted on the exterior of the aircraft, here the engine fan 18 for convenience. However, this measurement instrumentation may be mounted anywhere on the aircraft and are frequently mounted on the fuselage.

Figure 1:
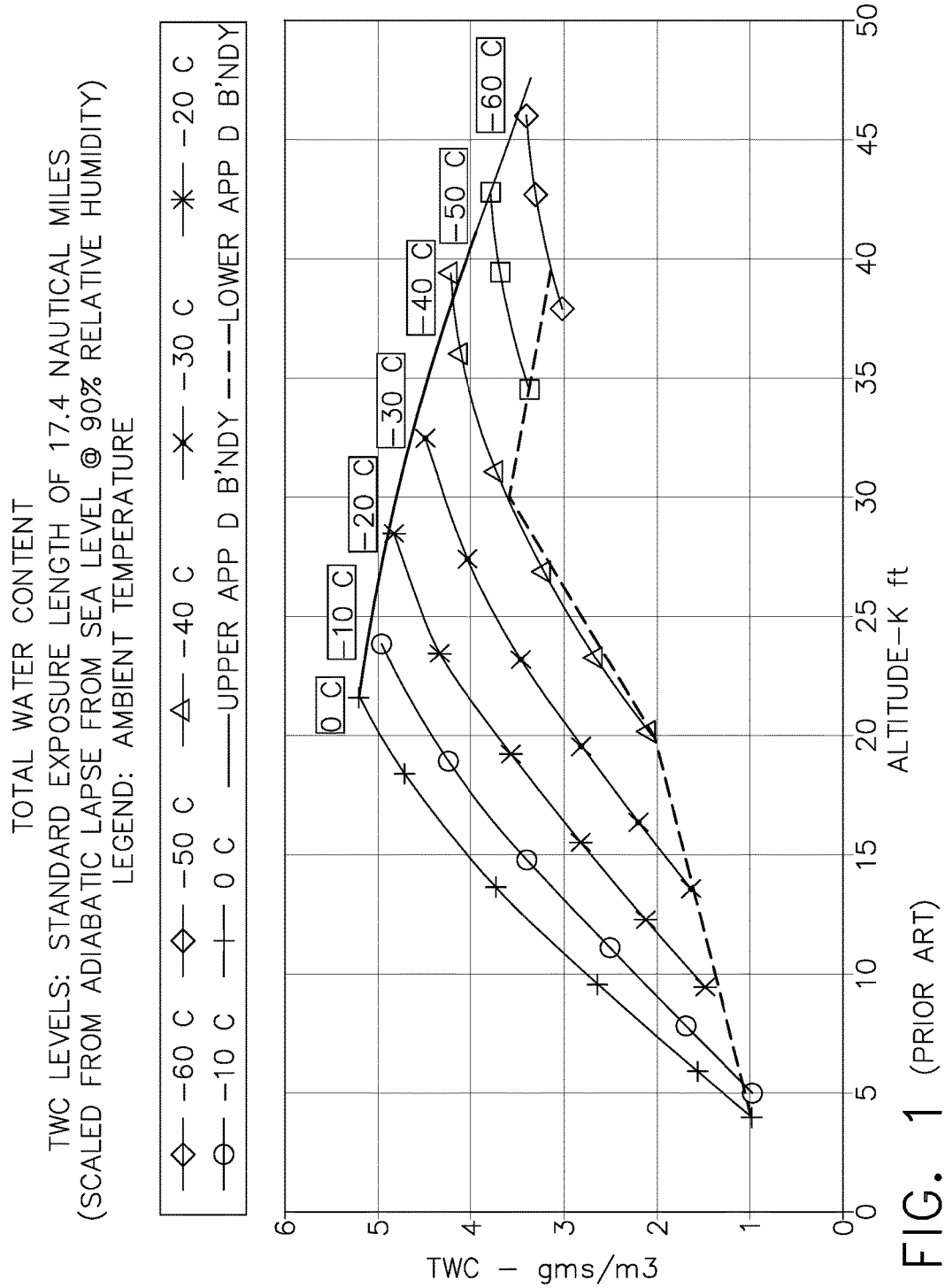
FIG. 1 is a graph of current (prior art) ice crystal icing conditions based on temperature, altitude and absolute humidity (TWC).

Instantaneous humidity measurement instrumentation 20 is depicted in FIG. 1 as mounted on an engine bypass duct 22. While instantaneous humidity measurement instrumentation 20 may be mounted anywhere on the aircraft that is exposed to ambient air, there are practical limitations as to the location of the humidity measurement instrumentation. Preferably, instantaneous humidity measurement instrumentation 20 may be mounted anywhere in the engine fore of combustors 34, which are located between compressor 28 and high pressure turbine 30, referred to simply as the cold side of the engine, even though compressor air temperature can reach elevated temperatures, currently of about 1200° F. in the last compressor stage. Engine temperatures aft of compressor 28 are sufficiently high to preclude operation of instantaneous humidity measurement instrumentation 20 for prolonged periods of time, if at all. But humidity measurement instrumentation 20 may be mounted aft of the compressor, for example, on a turbine case, provided precautions are made to maintain the temperature of instrumentation 20 at the selected location below a temperature at which it may be damaged, such as by providing cooling air.

Figure 6:
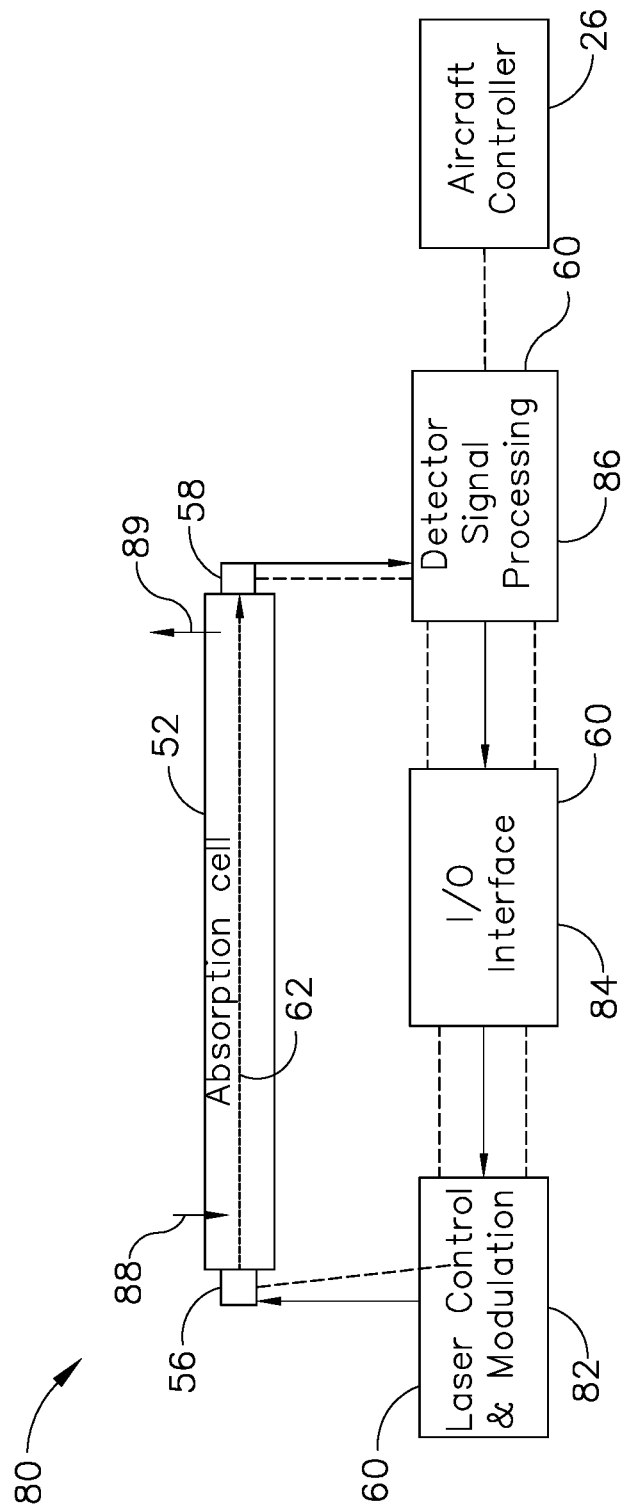
FIG. 6 is a schematic representation of a first embodiment of a humidity sensor that may be used as instantaneous humidity measurement instrument in the present invention.

Instantaneous humidity measurement instrumentation 20 obtains its readings by sampling ambient air. Because ambient air at altitudes at which ice forms, typically 0° C. and below, is so cold, any humidity in the air at ambient temperatures is necessarily in the form of liquid droplets or ice crystals, making it undesirable for accurate continuous total humidity monitoring. Ice crystals in the form of snow and/or ice particles reflect light, which is detrimental for rapid monitoring of humidity by absorption techniques, particularly techniques such as tunable diode laser absorption spectroscopy or TDLAS. Ambient air is drawn into the propulsion system, the aircraft engine, by operation of fan 18. Fan 18 may comprise one or more stages and typically heats the air drawn into the engine by 100° F. or more, which necessarily causes water droplet, snow, and/or ice particles in the air to form vapor. For example, three stage fan air (fan with three stages, air being drawn from the third or final stage) will raise the temperature of the air drawn into the engine by several hundred degrees. Air is split with a portion of the air flowing into bypass duct 22 and a portion of the air flowing into the compressor to support engine operation. Air in the bypass duct passes into exhaust nozzle 24 where it combines with exhaust gases from combustion and contributes to thrust. When an engine includes multiple fan stages, air passing into bypass duct 22 may be drawn from a latter fan stage, and the air from such a later stage may be above 212° F., meaning that the water in the air is in a gaseous state (steam). In either event, it is preferred that the water in the air entering instantaneous humidity measurement instrumentation 20 be present as a vapor or as a gas. In FIG. 2, instantaneous humidity measurement instrumentation 20 continuously samples air passing through bypass duct. A portion of instantaneous humidity measurement instrumentation 20, the absorption cell 52 and mirrors 54, see FIG. 6, are positioned within the bypass duct air stream and thus in fluid communication with ambient, heated air flowing through bypass duct 22, while other portions of instantaneous humidity measurement instrumentation 20, laser 56, detectors 58 and electronic controls enclosure and associated electronics 60, see FIG. 6, are located adjacent to bypass duct 22, but outside of the bypass duct air stream allowing for thermal vibrational isolation of these expensive and sensitive components from the absorption cell and the flowing air stream and for ease of maintenance.

Figure 3:
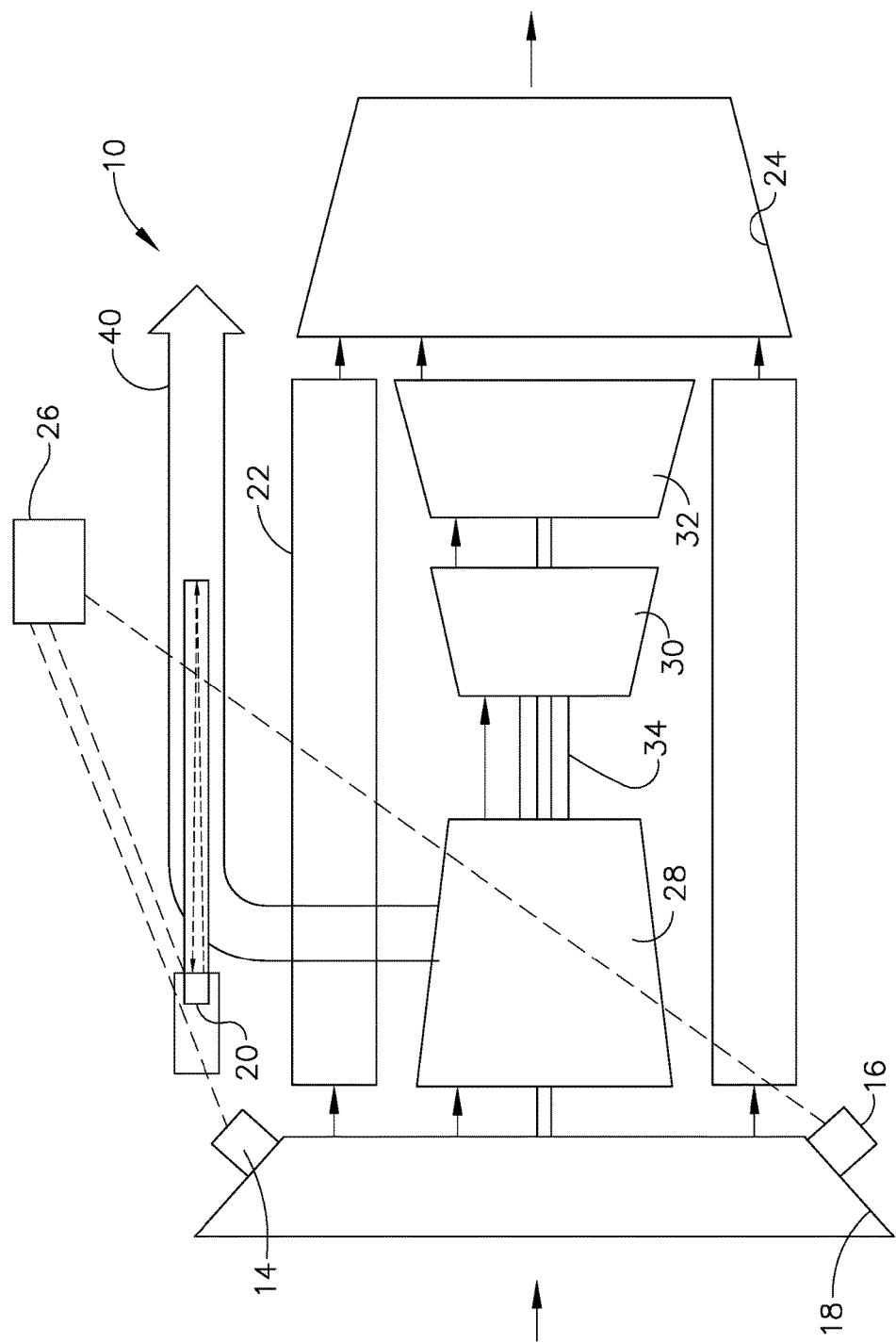
FIG. 3 depicts a humidity indicator mounted on a compressor bleed flow line.

FIG. 3 is similar to FIG. 2, except that the engine includes a compressor bleed flow line 40, and instantaneous humidity measurement instrumentation 20 is positioned proximate to compressor bleed flow line 40. In FIG. 3, a compressor bleed flow line 40 draws compressed air from compressor 28. Compressor air will necessarily have a higher temperature than fan air, so moisture in this compressor bleed flow line 40 should be steam. A portion of instantaneous humidity measurement instrumentation 20, the absorption cell 52 and mirrors 54 depicted in FIG. 6, are positioned within the bleed flow air stream, while other portions of instantaneous humidity measurement instrumentation 20, laser 56, detectors 58 and electronic controls enclosure and associated electronics 60, see FIG. 6, are located adjacent to compressor bleed flow line 40, but outside of the bleed flow air stream and thus not exposed to the elevated temperature air, allowing for better thermal isolation of these expensive and sensitive electro-optic and electronic components.

Figure 4:
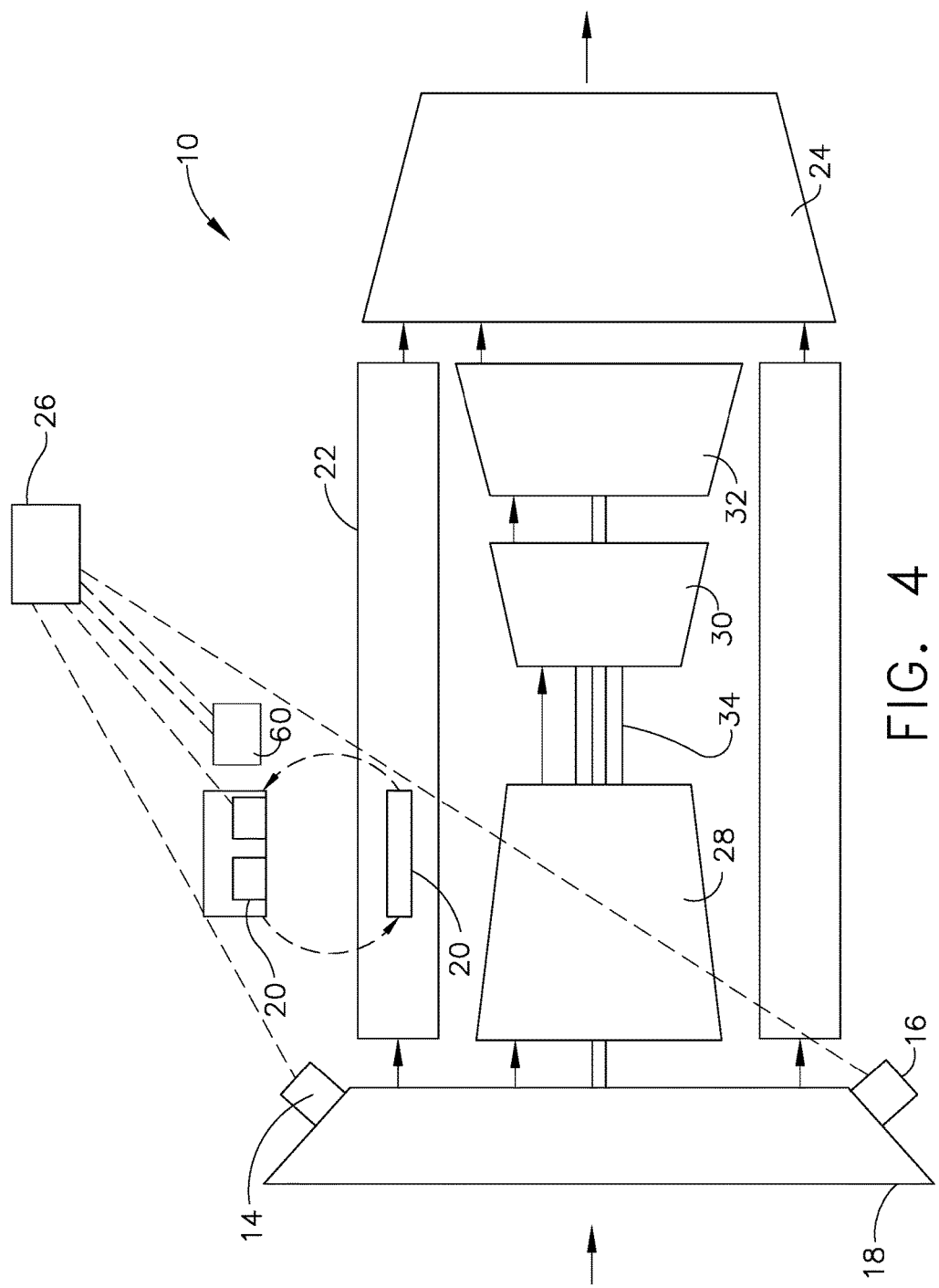
FIG. 4 depicts a humidity indicator which is partially mounted in a by-pass duct of the engine.

FIG. 4 is similar to FIG. 1 in that ambient air is sampled from air flowing in bypass duct 22. In the arrangement of FIG. 4, a portion of instantaneous humidity measurement instrumentation 20, the absorption cell 52 is positioned within the air flow in bypass duct 22, while other portions of instantaneous humidity measurement instrumentation 20, laser 56, detectors 58, and electronic controls enclosure and associated electronics 60 are located adjacent to bypass duct 22, but outside of the air stream flowing in bypass duct 22. In this arrangement, fiber optics is used to transmit the laser and detector signals to and from the absorption cell. This arrangement provides for better thermal isolation of the expensive and sensitive components of instantaneous humidity measurement instrumentation 20.

Figure 5:
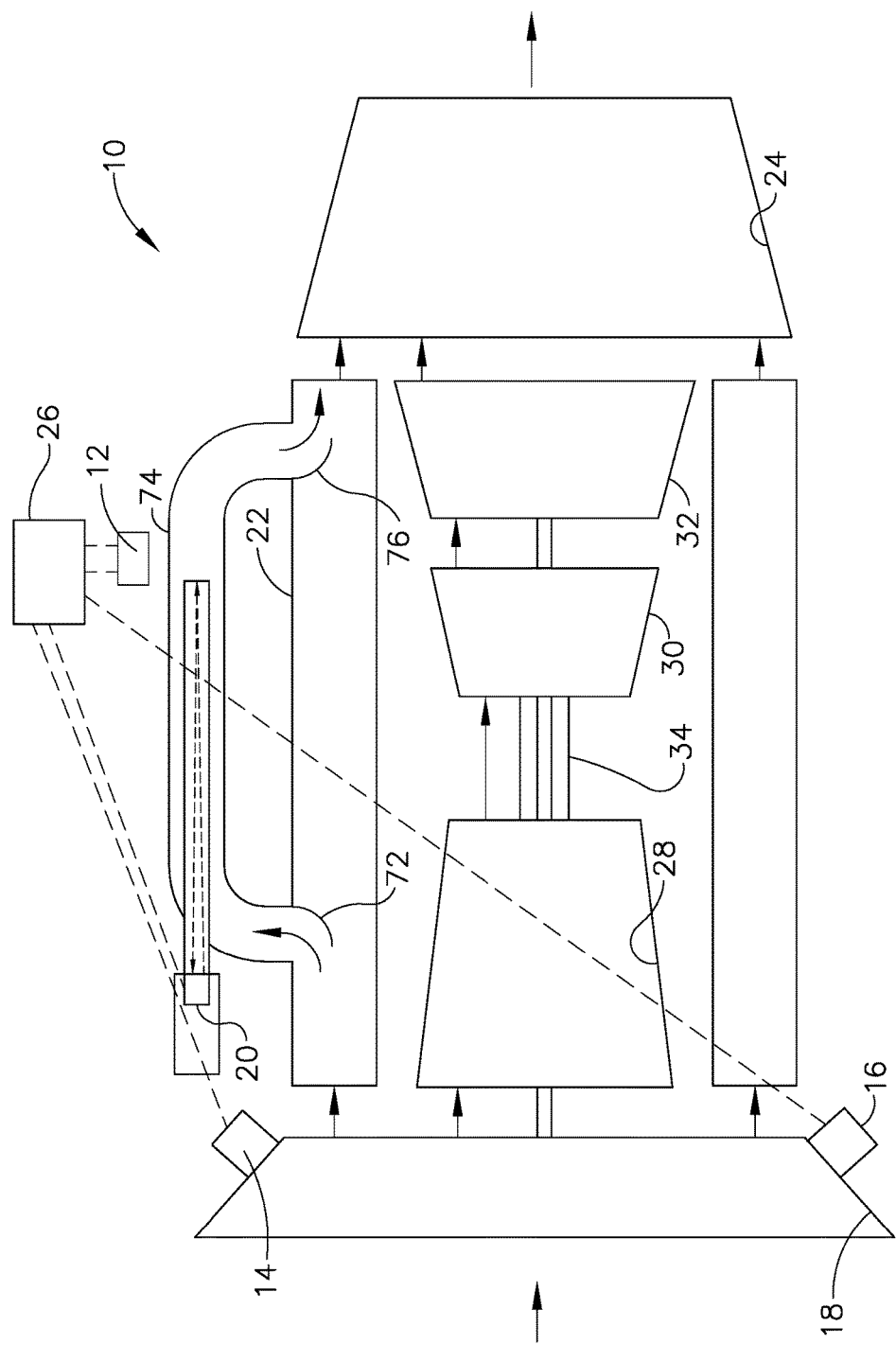
FIG. 5 depicts a humidity indicator mounted on an external bypass pipe in communication with a bypass duct.

FIG. 5 is similar to FIG. 1 in that ambient air is ultimately sampled from bypass duct air. However, in this arrangement, air is deflected from bypass duct 22 by an air scoop 72 into a fan air pipe 74 and ambient air is sampled for humidity by air flowing in fan air pipe 74. In the arrangement of FIG. 5, a portion of instantaneous humidity measurement instrumentation 20, the absorption cell 52 is positioned within fan air pipe 74, while other portions of instantaneous humidity measurement instrumentation 20, laser 56, detectors 58 and electronic controls enclosure and associated electronics 60 are located adjacent to fan air pipe, but outside of the air stream flowing in fan air pipe. Forward facing air scoop 72 recovers total pressure (dynamic head) of the fan duct flow to increase the pressure drop across fan air pipe 74. The arrangement may also include an optional aft facing scoop 76 that is used to reduce the sink pressure of fan air pipe 74. If an aft facing scoop 76 is not utilized, return air from fan air pipe 74 to bypass duct 22 may be located in a region with low static pressure, and air is exhausted into an engine bay or outside the aircraft. In FIG. 5, an air sampled by the sensor in fan air pipe 74 is returned to bypass duct 22 while laser 56, detectors 58 and electronic controls enclosure and associated electronics 60 are located outside fan air pipe 74, providing for improved thermal isolation and easier maintenance.

Figure 7:
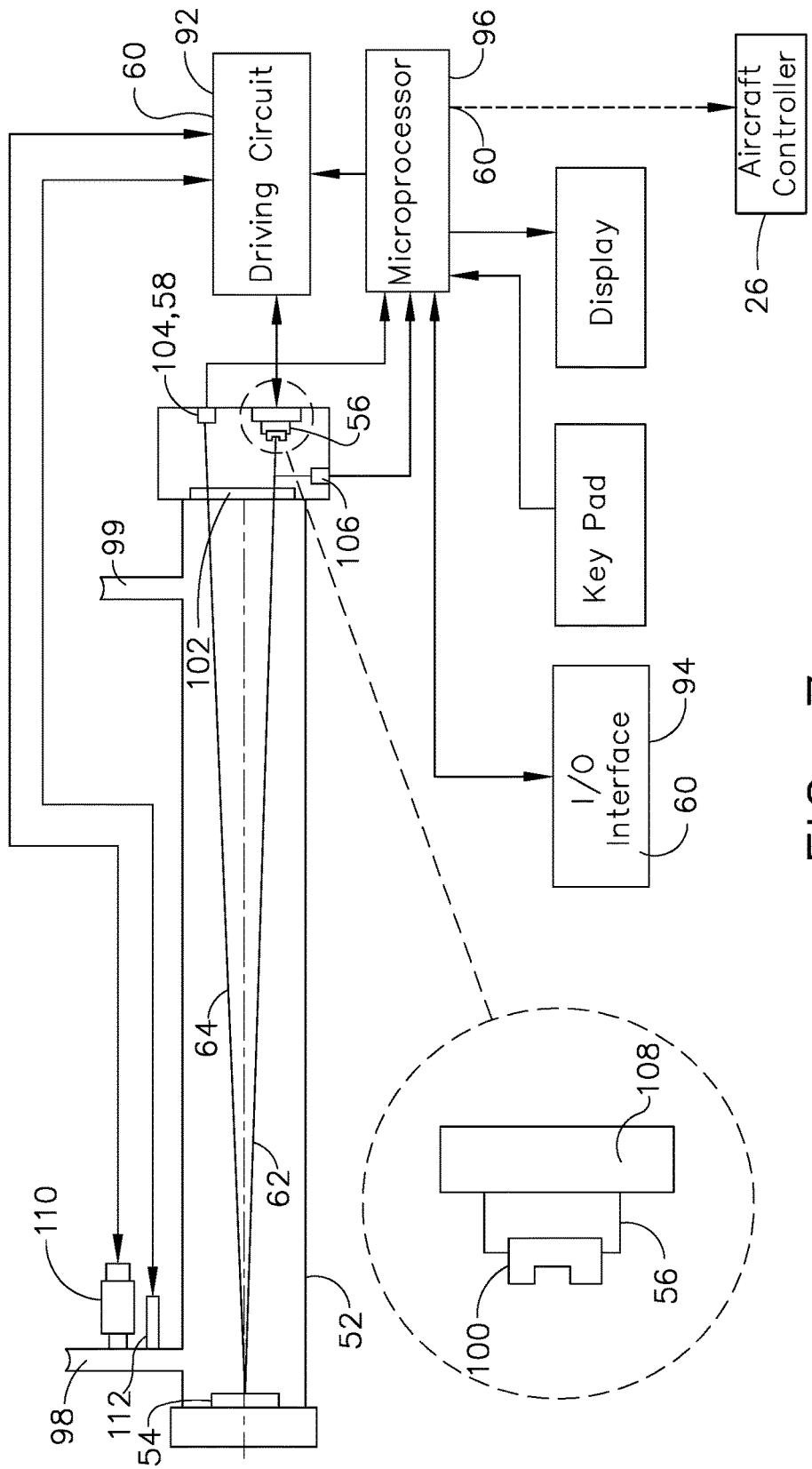
FIG. 7 is a schematic representation of a second embodiment of a humidity sensor that may be used as instantaneous humidity measurement instrument in the present invention.

FIGS. 6 and 7 provide embodiments of instantaneous humidity measurement instrumentation 20 which utilize Tunable Diode Laser Absorption Spectroscopy (TDLAS) technology to measure the total absolute humidity of ambient air entering the engine, as previously discussed. TDLAS technology measures the amount of absorption of radiation by water vapor. While any band of radiation may be used, typically the radiation is in the near infrared radiation band, in the wavelength range of 1-2 microns where both economical tunable diode lasers are available and suitable water molecule absorption lines are common. Absolute humidity is proportional to the radiation absorbed by the water vapor. The radiation at the desired wavelength, near the absorption band, is accurately produced by a laser. The TDLAS system comprises an absorption cell, which includes a measurement chamber, a tunable laser diode producing a laser beam, laser controls, a detector and detector signal processing electronics. Ambient air is constantly fed through the absorption cell from the air source, as set forth in the various embodiments of FIGS. 1-4. A small wavelength band spanning a water vapor absorption line is scanned by varying the current supplied to the laser. The laser wavelength increases as a function of time, the detector measures the water vapor absorption as a function of time. The maximum absorption at the center of the absorption line is compared to the near-zero absorption at wavelengths slightly below and above the line center. Laser modulation and control and other signal processing techniques are employed to further increase accuracy of the readings. TDLAS systems currently are used to monitor humidity in natural gas pipelines and are mounted on the fuselage of commercial airliners such as those operated by UPS and Federal Express to monitor climate change and assist in weather forecast models. The fuselage mounted sensors have nothing to do with icing condition sensing and no information is sent to the aircraft pilot or ice mitigation systems. In these fuselage mounted sensors, water droplets and ice crystals that may adversely affect the operation of the absorption cell are separated from the flow entering the absorption cell or cavity, leading to inaccuracies and the vapor laden air entering the absorption cavity is electrically heated.

Referring now to FIG. 6, there is depicted a schematic of a first embodiment of an instantaneous humidity sensor 80 for use as instantaneous humidity measurement instrumentation 20 in the present invention. This humidity sensor 80 is currently available from SpectraSensor of Houston, Tex. under license from University Corporation for Atmospheric Research (UCAR). In a first embodiment of humidity sensor 80, laser 56 and detector 58 are positioned at opposite ends of absorption cell 52. Electronics 60 which includes laser control and modulation 82, I/O interface 84 and detector signal processing electronics 86 are located in electronic controls enclosure which may be located remotely from absorption cell 52. Ambient air from a fuselage air scoop is drawn into air inlet 88 and exhausted from air outlet 89. Air resident in absorption cell 52 is in the path of a laser beam 62 from laser 56 at a first end of absorption cell. Detector 58 is located at a second, opposite end of absorption cell and receives laser beam 62, which is an attenuated laser beam. Electronics 60 compares the transmitted laser beam with the received laser beam and determines the humidity using preprogrammed algorithms. The calculated humidity is then transmitted to aircraft controller 26. This entire operation is performed in less than a second.

FIG. 7 provides a second embodiment of an instantaneous humidity sensor 90 for use as instantaneous humidity measurement instrumentation 20 in the present invention. This humidity sensor 90 is currently available from GE Sensing Inspection Technologies, 1100 Technology Park Drive, Billerica Mass. Zolo Technologies of Boulder, Colo. may offer alternative embodiments.

Humidity sensor 90 is similar to the first embodiment of humidity sensor 80 in that it includes an absorption cell 52 having an air inlet 98 and an air outlet 99, a laser 56, a laser detector shown as photodiode 104, and electronics controls 60 that include laser control and modulation, depicted as driving circuit 92, I/O interface 94 and detector signal processing depicted as microprocessor 96. Humidity sensor 90 also depicts a beam collimator 100 that also may be included with humidity sensor 80. Humidity sensor 90 differs from humidity sensor 89 in that laser 56 and detector 58 are both located at a first end of absorption cell 52 resulting in a longer absorption path in a shorter cell length. Additional passes may be added by providing a humidity sensor 90 having an absorption cell that utilizes a plurality of mirrors to reflect the laser beam, the mirrors reflecting the laser beam multiple times before being incident on the detector. This greater path length due to the multiple reflections in the absorption cell provides for greater accuracy by using such an absorption cell. While any such absorption cell will provide the improved accuracy, one such absorption cell is the Herriott multipass cell described in EP publication EP 2 375 237 published on Oct. 12, 2011 and incorporated herein by reference. Also included at the first end of absorption cell 52 is a thermoelectric heater/cooler 108 that may be used to maintain laser within a preselected temperature range. The relation between laser 56, collimator 199 and thermoelectric heater/cooler 108 is shown blown-up in circled inset in FIG. 6. If desired, the thermoelectric heater/cooler may be extended to provide temperature control for detector 58, if desired. Laser beam 62 is projected from laser 56 through optical window 102 axially across absorption cell 52 where it interacts with air input through air inlet and expelled through air outlet. Humidity sensor 90 includes a mirror 54 that reflects incident laser beam 62 (detector) through optical window 102 as reflected laser beam 64 where it is detected by first photodiode 104. A second photodiode 106 samples laser beam 62 prior to laser beam 62 passing through optical window 102. The signals from reflected laser 64 interacting with first photodiode 104 are provided to microprocessor 96, which processes these signals, compares it to the laser beam 62 produced by driving circuit and calculates the humidity based on preprogrammed tables of algorithms. The calculated humidity value is then transmitted to aircraft controller 26.

Humidity sensor 90 includes a pressure sensor 110 and a temperature sensor 112. These are not the same as pressure measurement instrumentation 16 and temperature measurement instrumentation 14 depicted in FIGS. 2-5. Pressure sensor 110 and humidity sensor 112 monitor the pressure and temperature of air entering absorption cell 52. Signals indicative of the monitored pressure and temperature are transmitted to driving circuit 92 and are utilized by laser control and modulation to fine tune the laser. Since the air entering the absorption cell is drawn from a fan stage, optionally through a bypass duct, a compressor stage, or through a bleed line associated with a fan stage or compressor stage, the air has a higher temperature and pressure than air on the exterior of the aircraft where ice formation occurs. Thus the temperature and pressure of air entering absorption cell 52 are different than the ambient air through which the aircraft is moving.

As indicated in FIGS. 6 and 7, both humidity sensor 80 and humidity sensor 90, when used as instantaneous humidity measurement instrumentation 20 in the present invention are in communication with the aircraft controller, transmitting rapidly calculated humidity measurements to aircraft controller 26 in real time. While aircraft controller may be a separate controller dedicated to monitoring the conditions for ice formation and activating or inactivating ice mitigation system 12 based on the readings, it is preferred that the complicated, independent engine controller operate the ice formation monitoring system 10 of the present invention as one of its modules. One such well known controller in the industry is referred to as Full Authority Digital Electronic Control or FADEC.

As the FADEC 26 obtains altitude, temperature, pressure and humidity information at altitudes at which ice formation is likely, it can continuously enter this data into preprogramed algorithms or compare the values to known values for ice formation in stored tables. When the FADEC 26 indicates that conditions have changed from ice formation negative to ice formation positive, the FADEC may initiate steps to mitigate ice formation, depending on one of several modes that FADEC may be in. When conditions are favorable for ice formation, FADEC sends a signal to activate ice mitigation system and inform the pilot that the ice mitigation system has been activated. The pilot may optionally override the automatic operation of the ice mitigation system. When conditions are not favorable for ice formation, FADEC sends a signal to deactivate the ice mitigation system and informs the pilot of the inactivation. The pilot or other crew member may select one of several modes for the ice mitigation system.

In a first crew member selectable mode, ice mitigation system is turned off. This mode is selected when there is no icing possibility for the aircraft, such as when local ambient temperature is too warm or when seasonal or geographic operations make icing impossible. Even when conditions are favorable for ice formation, which may be indicated on a control panel visible to the pilot or crew member, there may be a reason known to the pilot to turn the icing mitigation off.

In a second crew member selectable mode, ice mitigation system is activated. In this mode, referred to as an automatic mode, FADEC will automatically determine the conditions for ice formation. If the conditions do not favor ice formation, no ice mitigation occurs as it is not necessary. When conditions change to indicate that conditions for ice formation are favorable, the ice mitigation system is automatically activated and operates until conditions for ice formation are no longer favorable. When conditions are no longer favorable, FADEC inactivates the ice mitigation system.

In a third crew member electable mode, FADEC operates the ice mitigation system and displays on a control panel the status of ice formation, that is, whether conditions are favorable or unfavorable for ice formation. However, FADEC takes no action with respect to activation of ice mitigation system. This is a manual mode, and a pilot or crew member is responsible for activating or inactivating the ice mitigation system. A control switch in the cockpit is provided for this purpose. Thus, the pilot or crew member can manually activate or inactivate ice mitigation system at any time regardless of whether the ice formation monitoring system indicates that ice formation is favorable or unfavorable.

Thus, a pilot or crew member can override the automatic mode (second selectable mode) by switching to the third selectable mode (manual mode) and can assume responsibility for manual operation of ice mitigation system. Alternatively, if in automatic mode in which ice mitigation system is active, the pilot or crew member can override the automatic mode by switching to first selectable mode which essentially is an off position for ice mitigation system. The pilot or crew member may move from one selectable mode to another selectable mode as desired to choose the settings best suited for his/her flight operation, or to change modes when local conditions change or when the aircraft changes geographic or seasonal location.

Obviously, the instantaneous humidity measurement instrumentation 20 now makes it possible to monitor in real time icing conditions and automatically activate an ice mitigation system when conditions for ice formation are favorable and flight operations prefer the prevention of ice accumulation. In addition, it is also now possible to automatically inactivate the ice mitigation system when conditions for ice formation is no longer favorable, thereby avoiding the fuel consumption penalty and mechanical wear on variable engine geometry.

The instantaneous humidity measurement instrumentation 20 when properly placed in the engine eliminates inaccuracies in laser readings that are caused by ice and snow crystals or by the change in moisture content when ice and snow are separated before entering absorption cell 52. Moreover, when properly placed in the engine, the outside air will be heated to a temperature sufficient to convert ice, snow and water to a superheated water vapor, where water vapor comprises finely divided, often invisible water droplets dispersed in air and invisible superheated water vapor is steam, further improving the accuracy of the humidity determinations as these invisible forms of water are detected by the TDLAS. Of course, accurate humidity, temperature and pressure measurements are required to accurately monitor conditions suitable for ice formation and the instantaneous humidity measurement instrumentation 20 is suitably calibrated.

Since the ambient air is heated by air compression, either by the various fan stages or compressor stages, there is no need to heat cold ambient air with an electric heater before it enters the absorption cell 52.

Because the instantaneous humidity measurement instrumentation 20 is placed internally to the engine it causes no aerodynamic drag or performance penalty to the aircraft as it would with a fuselage mounted sensor.

While the invention sets forth instantaneous humidity measurement instrumentation 20 that can be used to provide an Icing Condition Detection system, it is recognized that off the-shelf humidity sensors cannot arbitrarily be inserted into an aircraft engine at various locations and used to monitor humidity. Although the specific design of instantaneous humidity measurement instrumentation 20 is outside the scope of the present invention, it is recognized that the density and temperature of the air used at various positions within the engine will vary, and the proper operation of the instantaneous humidity measurement instrumentation 20 depends on air density and air temperature. Thus, first, second and third stage fan air and compressor (stage dependent) air will all have different densities and temperatures, and instantaneous humidity measurement instrumentation location must be selected for acceptable operation based on densities and temperatures at each of these positions. The cavity length of the absorption cell is inversely proportional to air density. As the humidity measurement instrumentation becomes smaller with further development, additional positions within the main engine fan and compressor flow path may be able to accommodate placement of such instantaneous humidity measurement instrumentation 20. While humidity sensor design is outside the scope of this application, placement of instantaneous humidity measurement instrumentation 20 within the aircraft engine without adversely affection air flow in the engine is within the scope of this invention. These modifications to humidity sensors, discussed above, are within the scope of those skilled in the art.

As has been mentioned, the response time of TDLAS technology makes an effective ice formation monitoring system 10 viable. Instantaneous response time is essential so that changing temperature, pressure and humidity conditions can be evaluated essentially instantaneously (one second or less) to determine whether ice formation is becoming more favorable or is diminishing. The instrumentation set forth herein is limited by the gas flow time through absorption cell and signal processing time. When the laser absorption chamber is part of the engine system, the gas flow time through absorption cell and signal processing occur so quickly so as to be essentially instantaneous, and occur much faster than prior art chilled mirror systems.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An ice mitigation system, comprising:
   instantaneous humidity instrumentation mounted within an aircraft engine downstream of a fan stage;
   aircraft-mounted pressure measurement instrumentation;
   aircraft-mounted temperature measurement instrumentation;
   an aircraft propulsion system-mounted ice mitigation system; and
   a controller in continuous communication with the instantaneous humidity instrumentation, the pressure measurement instrumentation and the temperature measurement instrumentation, the controller receiving signals from the instrumentation indicative of instantaneous ambient humidity, temperature and pressure and continuously determining conditions for ice formation based on received signals, the controller signaling activation of the ice mitigation system when the determined conditions for ice formation based on signals received from the instrumentation are favorable and signaling deactivation of the ice mitigation system when the determined conditions for ice formation are unfavorable.

2. The system of claim 1 further including a compressor bleed flow line in fluid communication with a compressor stage, the humidity instrumentation having a humidity sensor positioned such that an absorption cell is mounted within the bleed flow line, and a laser, a detector and an electronic controls enclosure housing the electronics is positioned outside the compressor feed flow line, the laser and the detector in continuous communication with the electronics, the electronics continuously determining the measured humidity and transmitting a signal indicative of the humidity to the controller.

3. The system of claim 1 wherein the humidity instrumentation includes a humidity sensor having an absorption cell, a laser, a detector, a fiber optics transmitter, a fiber optics receiver and electronics, the electronics, the laser and the detector mounted in an electronics enclosure positioned outside of a fan bypass duct, and the absorption cell positioned within the bypass duct sampling bypass duct air flow, the fiber optics transmitter and a fiber optics receiver in communication with absorption cell through the fiber optics transmitter, the fiber optics receiver receiving the laser signal transmitted within the absorption cell and transmitting it to the detector in communication with the electronics, the electronics transmitting a signal to the controller indicative of the measured humidity.

4. The system of claim 1 further including a fan air pipe in fluid communication with a fan bypass duct, the humidity instrumentation having a humidity sensor positioned such that an absorption cell is mounted within the fan air pipe, and a laser, a detector and an electronic controls enclosure housing the electronics is positioned outside the compressor feed flow line, the laser and the detector in continuous communication with the electronics, the electronics continuously determining the measured humidity and transmitting a signal indicative of the humidity to the controller.

5. The system of claim 4 wherein the humidity instrumentation is mounted on a cold side of the aircraft engine.

6. The system of claim 4 wherein the humidity instrumentation is mounted on an engine turbine case.

7. The system of claim 4 wherein the humidity instrumentation is mounted on an engine compressor case.

8. The system of claim 4 wherein the humidity instrumentation samples engine air flow.

9. The system of claim 4 wherein the controller is a Full Authority Digital Engine Control (FADEC).

10. The system of claim 4 wherein fluid flow from the ice mitigation system is metered into an aircraft engine.

11. The system of claim 10 wherein fluid flow from the ice mitigation system is metered into the aircraft engine aft of a cold side of the engine.

12. The system of claim 1 wherein the instantaneous humidity instrumentation mounted on an aircraft engine includes a tunable diode laser absorption spectroscopy humidity sensor.

13. The system of claim 12 wherein the humidity sensor includes an absorption cell, a laser generating a laser beam, a detector and electronics mounted in an electronics enclosure, the laser mounted at a first end of the absorption cell, the detector mounted at a second opposite end of the absorption cell, and the electronics in communication with the controller.

14. The system of claim 12 wherein the humidity sensor includes an absorption cell, a laser generating a laser beam, a plurality of mirrors mounted at opposite ends of the absorption cell, a laser detector mounted at a first end of the absorption cell, electronics mounted in an electronics enclosure, the mirrors reflecting the laser beam multiple times before the laser beam is incident on the detector.

15. The system of claim 12 wherein the humidity sensor includes an absorption cell, a laser generating a laser beam, a laser detector, and electronics mounted in an electronics enclosure, the laser and the detector mounted at a first end of the absorption cell, a mirror mounted at a second end of the absorption cell and the electronics in communication with the controller, the mirror reflecting the laser beam from the laser to the detector.

16. The system of claim 15 wherein the humidity sensor is mounted to a fan bypass duct in the propulsion system, with the absorption cell mounted within the bypass duct, sampling fan air flow having an elevated temperature and pressure, the first end of the absorption cell including the laser, the detector and the electronics positioned outside the fan air flow.

17. A method for monitoring ice formation by an aircraft, comprising the steps of:
   providing measurement instrumentation to instantaneously monitor temperature, pressure and humidity in air through which the aircraft is travelling;
   mounting the temperature and pressure measurement instrumentation in a location on the aircraft at which the temperature measurement instrumentation continuously determines the actual air temperature and the pressure measurement instrumentation determines the actual air pressure;
   mounting the humidity measurement instrumentation in a location on the aircraft at which the humidity measurement instrumentation continuously and instantaneously determines actual humidity of the ambient air by continuously heating sampled air to a temperature sufficient to eliminate solid phases of water;
   providing a controller;
   maintaining communication between the temperature measurement instrumentation, the pressure measurement instrumentation and the humidity measurement instrumentation and the controller;
   continuously providing the determined conditions from the temperature measurement instrumentation, the pressure measurement instrumentation and the humidity measurement instrumentation to the controller, the controller determining whether the determined pressure, temperature and humidity are favorable for ice formation; and transmitting the favorability for ice formation to an aircraft flight crew.

18. The method of claim 17 wherein the humidity measurement instrumentation is mounted on a cold side of the engine.

19. A method for monitoring and mitigating ice formation by an aircraft, comprising the steps of:
providing measurement instrumentation to instantaneously monitor temperature, pressure and humidity in air through which the aircraft is travelling;
mounting the temperature and pressure measurement instrumentation in a location on the aircraft at which the temperature measurement instrumentation continuously determines the actual air temperature and the pressure measurement instrumentation determines the actual air pressure;
mounting the humidity measurement instrumentation in a location on the aircraft at which the humidity measurement instrumentation continuously determines actual humidity of the air by continuously heating sampled air to a temperature sufficient to eliminate solid phases of water;
providing a controller;
providing an ice mitigation system;
maintaining communication between the temperature measurement instrumentation, the pressure measurement instrumentation and the humidity measurement instrumentation and the controller;
continuously providing the determined conditions from the temperature measurement instrumentation, the pressure measurement instrumentation and the humidity measurement instrumentation to the controller, the controller determining whether the determined pressure, temperature and humidity are favorable for ice formation;
transmitting the favorability for ice formation to an aircraft flight crew, and
activating the ice mitigation system when ice formation is favorable.

20. The method of claim 19 wherein the controller automatically activates the ice mitigation system when ice formation is favorable and deactivates the ice mitigation system when ice formation is unfavorable.

21. The method of claim 19 including an additional step of providing a crew member selectable mode of operation switchable by a crew member between automatically activating the ice mitigation system when ice formation is favorable and inactivating the ice mitigation system.

22. The method of claim 19 including additional steps of
providing a controller-initiated signal providing a status of ice formation; and
providing a cockpit crew member a selectable mode of operation manually switchable by a crew member between activating the ice mitigation system and inactivating the ice mitigation system.

23. The method of claim 19 wherein the humidity measurement instrumentation is mounted on a cold side of the engine.

24. The method of claim 19 wherein the ice mitigation system heats aircraft engine propulsion surfaces.

25. The method of claim 19 wherein the ice mitigation system uses compressor bleed air to heat aircraft engine propulsion surfaces.

26. The method of claim 19 wherein the ice mitigation system uses pneumatic, hydraulic or electrical actuators to continuously, temporarily, intermittently or cyclically change engine geometry to shed or melt ice.

* * * * *